United States Patent [19]

Flaim

[11] Patent Number: 4,732,240
[45] Date of Patent: Mar. 22, 1988

[54] DRUM BRAKE ASSEMBLY, BRAKE SHOES FOR SAME, AND METHOD
[75] Inventor: Thomas A. Flaim, Troy, Mich.
[73] Assignee: General Motors Corporation, Detroit, Mich.
[21] Appl. No.: 36,709
[22] Filed: Apr. 10, 1987
[51] Int. Cl.[4] .................... F16D 51/00; F16D 69/00
[52] U.S. Cl. .............................. 188/78; 188/250 A; 188/250 G; 188/250 B; 188/331; 188/325
[58] Field of Search ...................... 188/78, 325–339, 188/250 A, 250 R, 250 B, 250 G, 250 H, 250 C, 250 E, 218 R; 192/107 R

[56] References Cited

U.S. PATENT DOCUMENTS

| 2,750,006 | 6/1956 | Super | 188/78 |
|---|---|---|---|
| 2,818,941 | 1/1958 | Berno | 188/78 |
| 2,848,073 | 8/1958 | Eksergian | |
| 2,910,145 | 10/1959 | Sampson | 188/78 |
| 3,007,549 | 11/1961 | Klein | |
| 3,013,637 | 12/1961 | Sampson | |
| 3,029,901 | 4/1962 | Olley | |

OTHER PUBLICATIONS

Orthwein, "Estimating Torque and Lining Pressure for Bendix-Type Drum Brakes", SAE Paper No. 841234, Oct. 1984.
USG 2456 dated Jan. 13, 1986, entitled "General Motors Corporation Response to Proposed FMVSS 135—Passenger Car Brake System", Docket No. 85-06, Notice 1, Appendices Nos. 1 and 12.
"Engineering Design Handbook—Analysis and Design of Automotive Brake Systems", DARCOM Pamphlet DARCOM-P 706-358, HQ, U.S. Army Material Development and Readiness Command, Dec. 1976, Chapters 1, 2 and 14.
Millner and Parsons, "Effect of Contact Geometry and Elastic Deformations on the Torque Characteristics of a Drum Brake", The Institution of Mechanical Engineers Proceedings, 1973, vol. 187, pp. 317-331, and Discussion, pp. D105-D108.
Motor Vehicle Performance—Measurement and Prediction, Section 6.0, "Braking Systems and Braking Performance", University of Michigan, Engineering Summer Conferences, Conference Proceedings, Jul. 9-13, 1972, pp. 157-208.
Steeds, "Brake Geometry-Theory of Expanding Rigid Types", Automobile Engineer, Jun. 1960, pp. 261-262.
Newcomb, "Determination of the Area of Friction Surfaces of Automotive Vehicles", Journal of Mechanical Engineering Science, vol. 2, No. 4, Dec. 1960, pp. 312-324.
Ferodo Ltd., "Friction Lining Calculations—The Sizing of Brake and Clutch Facings", Automotive Design Engineering, vol. 4, Jul. 1965, pp. 93-94.
Robinson, "Brake Design Considerations—Some Notes on the Calculation of Shoe Factor", Automobile Engineer, Sep. 1959, pp. 340-348.
Oldershaw and Prestidge, "Brake Design Considerations—An Approach Based on the Concept of a Centre of Pressure for the Reaction Between the Shoe and the Drum", Automobile Engineer, Apr. 1960, pp. 157-159.
Acres, "Some Problems in the Design of Braking Systems", The Journal of the Institution of Automobile Engineers, London, vol. XV, No. 1, Oct. 1946, pp. 19-49.
Fazekas, "Some Basic Properties of Shoe Brakes", Journal of Applied Mechanics, published by the American Society of Mechanical Engineers, vol. 25, Mar. 1958, pp. 7-10.

Primary Examiner—Douglas C. Butler
Attorney, Agent, or Firm—D. D. McGraw

[57] ABSTRACT

A drum brake assembly with the brake shoe lining friction surface subtending over a total effective friction surface arc length between the shoe heel and toe ends of about 49° on the first or primary shoe, symmetrical about the shoe horizontal center line, and about 57° on the second or secondary shoe, similarly symmetrical. The first or primary shoe may have about the same friction surface arc length as the second or secondary shoe in some instances, each then preferably being about 50% of the friction surface arc length of the prior art typical secondary shoe lining of about 117°. Different methods of reducing the effective friction surface arc lengths are disclosed, as well as the effect on brake effectiveness variations the invention has on brake assemblies, both with the same lining material composition and different lining material compositions. Background and test graphs are provided, as well as a review of accepted brake design considerations of the past leading the brake designer away from the invention.

17 Claims, 18 Drawing Figures

DRUM BRAKE ASSEMBLY, BRAKE SHOES FOR SAME, AND METHOD

The invention relates to drum brake shoes and drum brake assemblies, the drum brake shoes having brake linings with features of the invention. It is particularly applicable to drum brakes and also to vehicles having front wheel disc brake assemblies and rear wheel drum brake assemblies. It is further applicable to the choice of lining compositions for drum brakes wherein the range of various compositions that may be selected is expanded without a commensurate increase in the resultant range of brake effectiveness due to the employment of different types of lining compositions.

BACKGROUND OF THE INVENTION

Automotive vehicles have used drum brake assemblies on either the front or the rear axles, or both, for many years. In recent years it has also become commo to equip automotive vehicles with disc front brake assemblies and drum rear brake assemblies.

The type of drum brake assembly commonly known as a duo-servo drum brake has been used since the 1920's on millions of automotive vehicles including passenger cars, light trucks, heavy duty trucks, buses and trailers. Duo-servo drum brake assemblies are characterized by having a primary brake shoe and a secondary brake shoe with one set of adjacent shoe ends being acted upon by a wheel cylinder or cam to expand the brake shoes for braking engagement with a brake drum, and the other set of adjacent shoe ends typically being connected through an adjuster strut or link mechanism for maintaining the brake shoes in adjustment as the brake linings wear. The shoes are mounted on a backing plate and are capable of limited sliding movement in a somewhat arcuate direction as well as expanding outward to engage the friction surface of the brake drum. Other types of brake shoe assemblies have also been used at various times. These include leading-trailing brake shoe assemblies and leading-leading brake shoe assemblies, by way of example. However, the duo-servo type of brake shoe assembly has been most commonly used, particularly in passenger and light truck automotive vehicles.

It is a characteristic of the duo-servo drum brake that the hydraulic servo action obtained by pressurizing the wheel cylinder is augmented by a mechanical servo action of the brake shoes. In normal forward rotation of the brake drum, the primary brake shoe engages the rotating drum. The rotation of the drum with the shoe in engagement therewith arcuately drives the shoe mechanically toward the adjusting strut, generating additional brake actuating force transmitted through the adjusting strut and applied to the secondary brake shoe. Thus, the hydraulic servo action and the mechanical servo action cooperate to increase the brake torque at a higher rate than the gain without mechanical servo action.

At times it has been desirable to reduce the output variation of drum brakes which is a well-known condition that has existed for many years. Efforts to accomplish this have usually focused upon modifying both the shape and location of the anchor pin. It has been common in recent years, particularly with front wheel drive vehicles having disc brakes on the front wheels, to employ a wide, oval shaped anchor pin. This anchor pin reduces the gain of the foundation brake by permitting the anchor pin to be mounted closer to the friction surface of the drum, thereby reducing the leverage of the friction force reaction at the anchor. Another approach has been to locate the primary brake shoe lining below the center of the shoe, which generates a tendency to reduce the mechanical servo action of the primary brake shoe on the secondary brake shoe, thus reducing the gain of the duo-servo brake design.

Studies of vehicles employing leading-trailing drum brakes and duo-servo drum brakes have shown that neither type of drum brake is completely stable throughout the brake useful life in normal service. Drum brakes tend to increase in specific torque with usage. This trend in duo-servo brakes is somewhat offset by the tendency for the hold-off pressure to increase. Hold-off pressure is the hydraulic pressure applied to the wheel cylinder required to overcome the shoe retractor springs, the drag forces on the shoe exerted between the shoe and the backing plate, and wheel cylinder efficiency losses. These factors tend to increase with usage.

Various approaches to accommodate the brake system to output variations include the use of lower gain brake designs such as the disc brake or the leading-trailing drum brake. Disc brakes are known to decrease their brake effectiveness somewhat with use. Existing leading-trailing brakes have been known to increase brake output, decrease brake output, or remain relatively unchanged in brake output during their service life. This does not address the issue of variation in brake output during the useful life of the brakes, but instead attempts to somewhat reduce the effect of such variations through the us of such lower gain designs. This requires major retooling and validation, adding to the cost.

Contact pressure distribution between the friction material forming the brake lining and the drum brake friction surface results from a complex relationship between the anchor pin location, the wheel cylinder location, the magnitude of the hydraulic brake actuating pressure applied, the primary and secondary shoe and lining stiffness, and the drum stiffness and deflection during loading. This contact pressure distribution may also be affected by the work history of the brake as the brake lining wears.

The history of analysis, theory and understanding regarding drum brakes has indicated that such analysis and understanding has not kept pace with the practical design and production of drum brakes. A reasonably comprehensive listing of literature and source documents relating to such analysis, theory and understanding is as follows:

(1) Acres, "Some Problems in the Design of Braking Systems", The Journal of the Institution of Automobile Engineers, London, Vol. XV, No. 1, Oct. 1946, pp. 19-49.

(2) Fazekas, "Some Basic Properties of Shoe Brakes", Journal of Applied Mechanics, published by the American Society of Mechanical Engineers, Vol. 25, March 1958, pp. 7-10.

(3) Robinson, "Brake Design Considerations—Some Notes on the Calculation of Shoe Factor", Automobile Engineer, September 1959, pp. 340-348.

(4) Oldershaw and Prestidge, "Brake Design Considerations—An Approach Based on the Concept of a Centre of Pressure for the Reaction Between the Shoe and the Drum", Automobile Engineer, April 1960, pp. 157-159.

(5) Steeds, "Brake Geometry—Theory of Expanding Rigid Types", Automobile Engineer, June 1960, pp. 261-262.
(6) Newcomb, "Determination of the Area of Friction Surfaces of Automotive Vehicles", Journal of Mechanical Engineering Science, Vol. 2, No. 4, December 1960, pp. 312-324.
(7) Ferodo Ltd., "Friction Lining Calculations—The Sizing of Brake and Clutch Facings", Automotive Design Engineering, Vol. 4, July 1965, pp. 93-94.
(8) "Motor Vehicle Performance—Measurement and Prediction", Section 6.0, "Braking Systems and Braking Performance", University of Michigan Engineering Summer Conferences, Conference Proceedings, July 9-13, 1972, pp. 157-208.
(9) Millner and Parsons, "Effect of Contact Geometry and Elastic Deformations on the Torque Characteristics of a Drum Brake", The Institution of Mechanical Engineers Proceedings 1973, Vol. 187, pp. 317-331, and Discussion, pp. D105-108.
(10) "Engineering Design Handbook—Analysis and Design of Automotive Brake Systems", DARCOM Pamphlet DARCOM-P 706-358, HQ, U.S. Army Materiel Development and Readiness Command, December 1976, Chapters 1, 2 and 14.
(11) Orthwein, "Estimating Torque and Lining Pressure for Bendix-Type Drum Brakes", SAE Paper No. 841234, October 1984.
(12) USG 2456 dated January 13, 1986, entitled "General Motors Corporation Response to Proposed FMYSS 135—Passenger Car Brake System, Docket No. 85-06, Notice 1, Appendices Nos. 1 (Glossary of Terms) and 12 (variability). This report is a public record filed with the Associate Administrator for Rule Making, NHTSA, 400 Seventh St. SW, Washington, D.C. 20590.

In various ones of these documents one may find analyses of many different drum brake configurations including leading-leading, trailing-trailing, leading-trailing, and duo-servo brakes. Document (12) above provides an excellent glossary of brake terms in its Appendix 1 and a thorough discussion of brake variability in its Appendix 12. Early problems which the analysis of drum brake designs tried to solve included developing sufficiently powerful designs and predicting the output of such brakes prior to the construction of test parts.

The development of the duo-servo drum brake, where the primary brake shoe is used to increase the applied load to the secondary brake shoe to increase the torque output of the drum brake, yielded a very powerful brake in a relatively small physical package which did not require large displacement hydraulic systems. These advantages are still found in this type of drum brake as it is used today. The early modeling efforts assumed a graphical approach to calculate "shoe factors", a phrase meaning the specific torque attributable to each individual brake shoe. These early efforts dealt primarily with the geometrical leverage ratios associated with wheel cylinder location, anchor pin location, etc., and assumed a uniform pressure distribution along the friction interface. It appears that the uniform pressure distribution was assumed because such an assumption was then convenient for analytical solution of the brake design. Examples are found in Acres, Fazekas, Steeds and Oldershaw noted above, as well as other treatises. Later design and theory efforts recognized that the uniform distribution assumption did not correctly predict the measured specific torque of drum brakes. This led to analysis based on the assumption of a sinusoidal pressure distribution.

All brake design efforts prior to the early 1970's assumed that both the drum and the brake shoe as well as the lining on the shoe were rigid and did not undergo elastic deformation under load even though the theorists realized that this was not the case. This assumption was made in order to simplify the analytical efforts. It was only with the advent of high speed digital mainframe computers and the development of finite element analysis that the shoe and drum deflection have been able to receive any theoretical effort. The 1973 article by Millner and Parsons, noted above, dealt with these deflections. That article also contains the observation that the pressure distribution may change due to work history of the brake. Heel-toe contact was analyzed for a leading-leading drum brake and shown to cause an increase in brake output. That article and the discussions appended thereto also discussed variations with changes in coefficients of friction of different lining materials. Millner and Parsons touched on the effect of lining arc length in relation to the "shoe factor", but had no discussion or other indication which would point to the desirability of short lining arc lengths as now proposed.

Historically, brake system engineers have held a skeptical view point with regard to the ability of drum brake mathematical models to accurately predict the specific torque characteristics of practical drum brake designs. This has seemingly resulted from their experience in seeking to accurately employ the model predictions in designing vehicle brake systems. For example, minute changes in the dimensions of the component parts of the typical drum brakes in use for many years, or changes in lining composition and thus the friction coefficient of the lining, may result in changes in drum brake specific torque, and thus similar changes in the torque output of a brake. A missing piece of the puzzle has always been the knowledge of the actual lining-drum friction interface pressure distribution. The classical assumptions of rigidity and consistent pressure distributions have been coupled with the practical experience of the brake system engineers to produce a significant body of skeptics regarding the usefulness of models and drum brake analysis.

Several of the publications noted above touched on the arc length of the brake lining material. There is a common thread of thought throughout them that there should be as much arc length reasonably practical, considering the need for cooling. The unit load on the friction material, as well as its deformation and wear characteristics, further led to the broad adoption in duo-servo brakes of primary and secondary shoes with arc lining lengths in the ranges of 90° to 100° and 110° to 120°, respectively, and particularly respective lining arc lengths of about 97° and 117°.

Acres proposed the use of four shoes with 75° to 80° arc length each, but found that there was insufficient heat dissipation, probably because the linings covered most of the drum friction surface at all times and hindered cooling. He expressed a thought that maybe he should have tried only two such shoes, with double duty on the lining, just as a check, but did not pursue this further. Instead, Acres cited with approval an article by Super in the May 1946 issue of the SAE Journal that the total arc length should be reduced to 240° because of the heat dissipation problem. Assuming an even division between two shoes, each shoe lining would then have an arc length of 120°. Acres also discussed the effects of various friction lining materials, noting the changes which occur with them. He made it obvious that different materials yielded very different results.

The Steeds paper made assumptions relating to rigidity and full contact of the lining with the brake drum along its whole lining arc. Steeds gives no indication that he was considering lining arc lengths other than those in common use at the time and about the same as the other prior art.

Oldershaw and Prestidge, contemporaries of Steeds, touched on lining arc lengths, and concluded that the limits of lining arc length for a shoe were 80°–135°, with graphs clearly showing their position that shoe lining arc lengths of 100°–120° were the most practical.

Some typical patent disclosures discussed below indicate various developments in brake shoes and linings which generally relate to the problems solved by the use of the invention herein disclosed and claimed.

U.S. Pat. No. 2,750,006, entitled "Brake" and issued June 12, 1956, dealt with improvements in brake lining wear and chatter. The invention was that of a brake lining of a pivoted shoe assembly in which the brake lining has a cylindrical curvature at least at both ends greater than the cylindrical curvature of the internal surface of the brake drum with which the shoe is brought into contact during rotation of the wheel being braked.

U.S. Pat. No. 2,818,941, entitled "Motor Vehicle Brake Construction" and issued Jan. 7, 1958, proposed that the primary lining of a duo-servo brake assembly be made considerably narrower in width than the secondary lining. By proper proportioning of these widths, substantially uniform unit pressures between each of the linings and the drum was considered to be obtained. It was felt that this would reduce brake fade under severe braking conditions.

U.S. Pat. No. 2,848,073, entitled "Friction Device Such As A Brake" and issued Aug. 19, 1958, proposed the use of a plurality of short lining elements on each brake shoe. The lining elements on both shoes together occupied a total of about 60° of the total circumference of 360°. Thus each brake shoe has, as shown and described, about a total of 30° of arc length, divided into two sections apparently of about 15° each, for each shoe. The inventor recognized that additional cooling area contributed to the satisfactory performance of his brake. However, he had no recognition of the pressure distribution or the deflection characteristics of shoes and drums. He also did not recognize any advantages with regard to the different coefficients of friction of different materials, even though he suggested the use of non-metallic or composition aligning elements. He arranged these shoes in a leading-trailing shoe assembly. The inventor limited his friction devices to having a plurality of short pads on each shoe, the pads being spaced from the horizontal axis of the shoe and therefore more adjacent each of the shoe ends than the lining herein disclosed and claimed.

U.S. Pat. No. 2,910,145, entitled "Brake Structure" and issued Oct. 27, 1959; and U.S. Pat. No. 3,013,637, entitled "Brake" and issued Dec. 19, 1961, show other configurations using small multiple friction lining pad units in a duo-servo brake context. In a similar fashion, U.S. Pat. No. 3,007,549, entitled "Friction Controlling Means" and issued Nov. 7, 1961, provided gaps between various friction lining sectors on the secondary brake shoe of a duo-servo brake arrangement, or on both brake shoes of a leading-trailing brake arrangement.

U.S. Pat. No. 3,029,901, entitled "Vehicle Drum Brake" and issued April 17, 1962, concerns a duo-servo drum brake with a modified anchor arrangement to limit the self-energizing force on the secondary shoe. The disclosure also shows two sectors of brake lining materials provided on the primary shoe and the secondary shoe, the sectors being mounted at the heel and toe of each shoe and considerably spaced apart and well away from the horizontal axis of the assembly. It is noted that the patentee utilized the brake analysis of Acres as set forth in the article referred to above.

The technology of asbestos-containing friction materials for drum brakes has evolved over a period of more than 70 years with improvements in wear, fade and friction stability continuing over this time span. Some of the above noted articles and papers touch on this. The technological development of non-asbestos friction materials, particularly for drum brake applications, has been occurring to any major extent only in about the last 10 years. While the non-asbestos technology has been successful in the development of metal fiber reinforced materials for disc brake applications, attempts to use a wide range of mineral, metal and man-made fibers in drum brake applications has met with only limited success. Although some limited activity occurred 25 to 30 years ago, the results were never widely adopted, at least in part because of wear and noise problems. Among the issues faced in drum brake applications were and are wear, friction, braking effort variations, and noise performance of non-asbestos materials.

Because it is desirable to eliminate the use of asbestos products, and because the more suitable non-asbestos friction materials generally have higher friction coefficients than the presently used asbestos friction materials, the brake industry has tended to plan to meet a proposed government ban on asbestos by designing future vehicles with lower gain rear brake systems such as leading-trailing drum brakes. To produce equivalent brake torque, these alternative brake systems require larger hydraulic displacement, which has a design impact on master cylinder size and brake booster response as well as brake pedal ratio. The brake engineer also has to consider the desired stopping distances and the effects of such changes thereon, as well as modulation by either manual or anti-lock brake control systems, particularly when displacements are increased. Even if the various factors so noted can be treated through innovative system designs, the concern of variability in brake output with higher friction coefficient materials must be addressed to insure acceptable brake performance throughout the reasonable useful life of the brakes on the vehicle. If the use of asbestos products are prohibited in brake linings manufactured for service use, an issue that is also in need of consideration is that of servicing existing vehicles with non-asbestos lining substitutes when the brakes were designed for use with asbestos friction materials.

ADVANTAGES OF THE INVENTION:

The invention is based on new studies and analyses (feasible only recently because of availability of computer capabilities) which have challenged the standard assumptions of brake designers used for many years about rigidity and pressure distribution over the friction surface faces of drum brake linings. Unexpected and advantageous results (as compared to expected results using the earlier standard rigidity and pressure distribution assumptions) include:

(A) substantially decreased change in output or brake effectiveness, with changes in friction coefficient;

(B) substantially decreased deviation from the braking effectiveness or effort of new drum brake linings with usage, giving more consistent braking effort over the life of the brake linings;

(C) reduced variations in the use of different lining formulations, from organic asbestos-containing formulations to inorganic semi-metallic or other formulations;

(D) more consistent brake adjuster performance;

(E) less lining piece cost while improving performance;

(F) improved match between front disc and rear drum brake lining life on a vehicle; and (G) improved mass and volumetric efficiency. Because of (C) above, it appears that inorganic, non-asbestos linings may now be substituted for organic linings having asbestos in them with positive benefits instead of some negative results which have until now been a severe block to the elimination of asbestos-containing linings.

Leading-trailing brakes have been seriously considered by brake designers and manufacturers as a replacement for duo-servo brakes in recent years because of (A), (B), and (F) above, requiring high tooling and other costs, as well as the scrapping of duo-servo brake manufacturing facilities which are currently efficiently used. Short arc linings will permit the continued use of duo-servo drum brakes.

DESCRIPTION OF THE INVENTION

The invention herein disclosed and claimed relates to the control of output variation produced in drum brakes, and particularly in duo-servo drum brakes, resulting from the variations in contact pressure distribution between the friction material and the drum brake friction surface. By use of the invention, the effect of the contact pressure distribution variations can be substantially reduced. Recent analytical and vehicle studies of production vehicles have shown that the drum brake output variations are largest when the contact pressure distributions are concentrated at the largest deviations from the horizontal center line of the drum brake assembly. A "worst case" condition of heel-toe contact, in which pressure distribution contact of the lining with the drum occurs only at the top and bottom of each shoe, produces an output variation of approximately twice the nominal brake output efficiency. This has been found to occur in brakes using prior art shoe assemblies. However, for test purposes, to assure such worst case occurrence, a brake shoe was provided with lining material at each end location of a standard 117° arc lining, each such lining end being about one inch long along the arc and therefore covering about 10% of the normal 117° arc length. Nominal brake output efficiency is expressed as a specific torque or the slope of the torque-pressure plot with full lining contact. Therefore for the worst case condition of heel-toe contact, the drum brake output can be as much as or even more than, twice the nominal output.

It has been found that the effect of contact pressure variation can be reduced by limiting the lining arc length and placing the short arc length lining on the shoe so that it is symmetrical about the brake assembly horizontal axis without changing any other factors in the drum brake assembly such as the location of the anchor pin, the wheel cylinder displacement requirements, and other factors discussed above. This reduces the concentrations of contact pressure distributions from large deviations from the horizontal center line of the drum brake assembly to short variations from the horizontal center line, particularly with the shorter arc brake lining being positioned symmetrically about the horizontal center line of the drum brake assembly.

It has also been found that the limitation of lining arc length to the ranges more specifically prescribed will substantially reduce the variable effects of different coefficients of friction caused by the use of different lining material compositions while providing sufficient lining area so that the useful life of the linings in vehicle rear drum brakes is commensurate with the useful life of vehicle front disc brakes. This will therefore permit the use of non-asbestos lining materials in duo-servo brake systems without changing other portions of the system such as the displacement of the wheel cylinder, the master cylinder, etc. This has the added benefit of being able to provide drum brake shoes with linings extending through arc lengths and located in accordance with the invention herein disclosed and claimed for use on vehicles that have been produced in past years as well as vehicles yet to be produced. No reconfiguration of the brake system of vehicles already in use is required. Brake shoes provided with linings following the invention herein disclosed and claimed will substantially decrease the tendency to large variations in brake effectiveness of the drum brakes with use, therefore maintaining more constant vehicle brake performance throughout the useful life of the brakes than is obtained when the drum brakes have wide changes in effectiveness with use. This decrease has been found to be typically a factor of four decrease. Even though shorter arc length linings are likely to wear somewhat more quickly than the full arc length linings that have been in common use for many years, those made in accordance with the invention will typically wear at a rate such that when installed as rear brakes in vehicles with front disc brakes, for example, they would normally be replaced at about the same time that the disc brake pads of the front disc brake assemblies would be replaced. Typically, current production vehicles with front disc brakes and rear drum brakes have been found to wear the disc brake pads so as to require their replacement at about one-half the mileage at which the rear drum brake linings require replacement due to wear. The use of approximately half of the amount of lining on each drum brake shoe as compared to current production brake shoes, and the ability to continue the manufacture of drum brakes for which brake manufacturers are already tooled, usually requiring changing only the lining arc lengths and the lining compositions, will also result in increased economy of manufacture.

Figures 1, 2, 3:
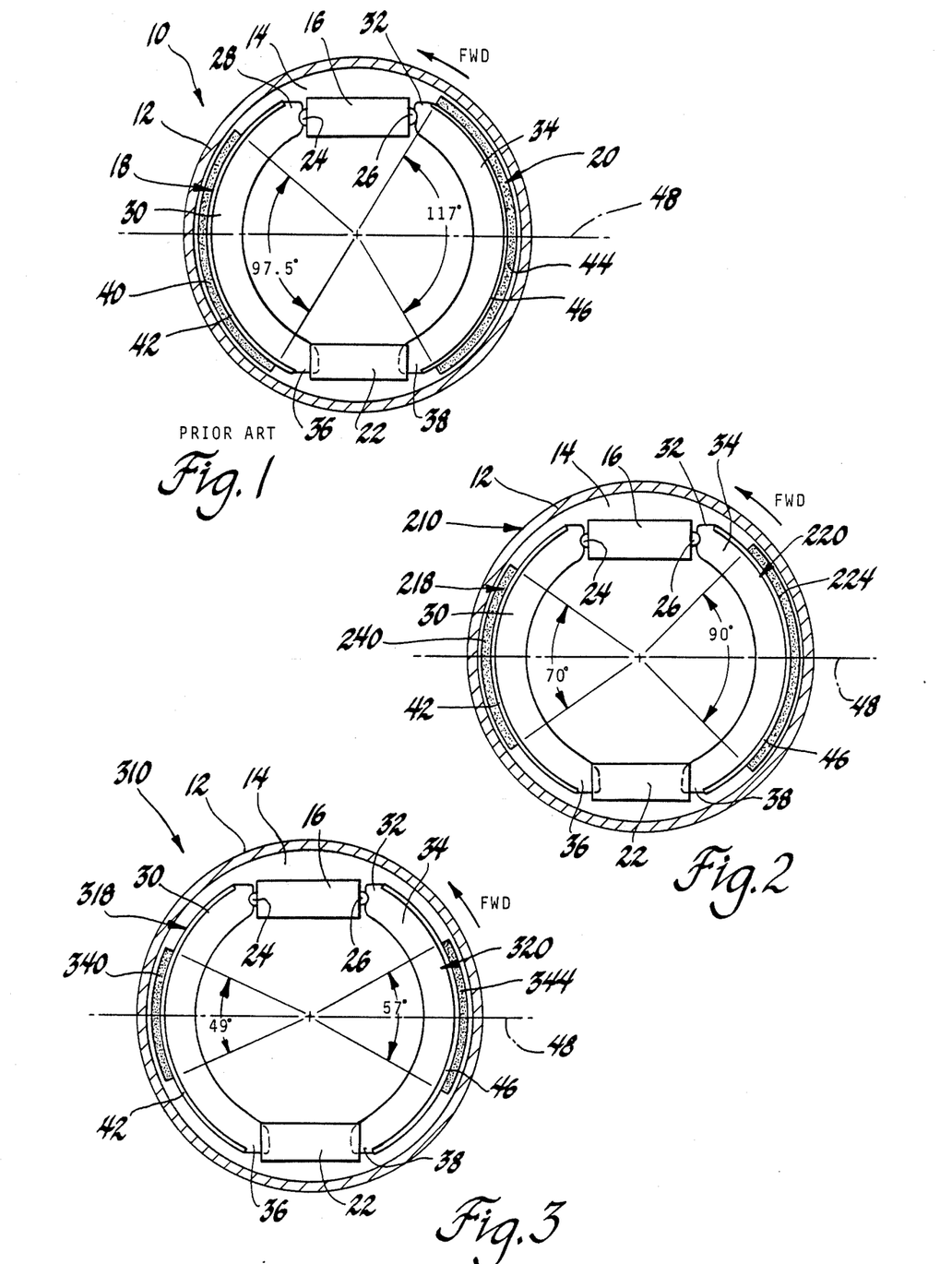
FIG. 1 is a simplified elevation view with parts in section and illustrating a typical prior art duo-servo drum brake and particularly the typical brake lining arc lengths of such a brake.
FIG. 2 is similar to FIG. 1 but illustrates a drum brake assembly with a primary shoe having a 70° lining arc length and a secondary shoe having a 90° lining arc length, the shoe lining arc lengths being symmetric about the horizontal center line of the brake shoe assembly.
FIG. 3 is similar to FIG. 2 and illustrates a drum brake assembly wherein the primary shoe lining arc length is about one-half of the prior art primary shoe arc length and the secondary shoe lining arc length is about one-half of the secondary shoe lining arc length of the prior art assembly, the shoe lining arc lengths being symmetric about the horizontal center line of the brake shoe assembly.

The prior art brake shoe assembly of FIG. 1 is of the type found in production duo-servo drum brake assemblies in use for many years on vehicles manufactured throughout the world. The simplified drum brake assembly 10 illustrated includes a rotatable brake drum 12 which is suitably secured to a vehicle wheel for a rotation there with as is well known in the art. The assembly has a backing plate 14, a wheel cylinder 16, a primary brake shoe assembly 18, a secondary brake shoe assembly 20, and a brake adjuster strut 22. As is well known in the brake art, the wheel cylinder 16 is attached either to the backing plate or a fixed flange and is arranged to receive hydraulic brake actuating pressure therein to actuate the drum brake. The wheel cylinder is illustrated as having oppositely disposed plungers 24 and 26 connected to wheel cylinder pistons inside the wheel cylinder housing. Plunger 24 engages end 28 of the brake shoe 30 of primary brake shoe assembly 18. Plunger 26 engages the end 32 of the brake shoe 34 of the secondary brake shoe assembly 20. It can be seen that the shoe ends 28 and 32 are considered to be adjacent ends. The opposite adjacent ends 36 and 38 of shoes 30 and 34 respectively are arranged to engage the adjuster strut 22 as is well known in the art. The shoe assemblies 18 and 20 are suitably mounted by means, not shown, to the backing plate 14 so that the shoes can move in various directions parallel to the backing plate as the brake is actuated and released. This arrangement is well known in the drum brake art.

Shoe assembly 18 has a brake lining 40 secured to the shoe rim 42 in a suitable manner well known in the art. Similarly, brake shoe assembly 20 has a brake lining 44 suitably secured to the shoe rim 46 of shoe 34. In the typical prior art brake assembly illustrated, the primary brake shoe lining 40 subtends through an arc length of about 97.5° as illustrated, and has a greater portion thereof positioned below the horizontal center line 48 of the brake shoe assembly than the portion above that horizontal center line. The secondary brake shoe lining 44 subtends through a lining arc length of about 117° as illustrated, and may be symmetrical about the horizontal center line 48.

As can be seen, this arrangement follows the brake design teachings which have been set forth consistently in brake design treatises on the subject over the years, including the location of the primary shoe lining in an arcuate direction nearer the adjuster strut 22 so that more of the lining is below the center line 48 than above that center line. This type of drum brake assembly is typical of those found for many years on vehicles produced in the United States as well as many other parts of the world. Similar brake shoe assemblies have been used on front wheels as well as rear wheels. With the common advent of disc brake assemblies on the front wheels of many passenger and light truck vehicles, drum brake assemblies have been continued to be used on the rear wheels. It has been common practice to use duo-servo drum brake assemblies, with various arrangements having been made to provide a somewhat lower gain for the drum brake assembly that is the case when the maximum duo-servo effect is used.

Figure 4:
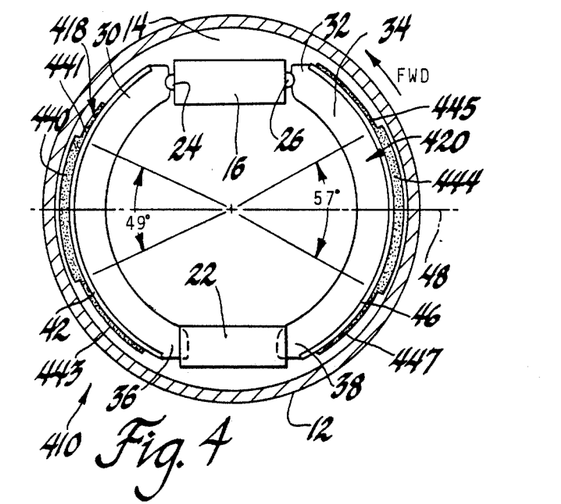
FIG. 4 is similar to FIG. 3 and illustrates a drum brake assembly wherein the effective arc length of the primary and secondary brake shoe linings are the same as in FIG. 3, but the linings of the prior art linings of FIG. 1 have been altered to create the desired effective lining arc lengths, the shoe lining effective arc lengths being symmetric about the horizontal center line of the brake shoe assembly.

FIG. 2 illustrates a modification of the drum brake assembly of FIG. 1. It shows an intermediate stage of the development of the concept of the invention herein disclosed and claimed in a range of brake lining arc lengths which approach the upper limits of desirability to obtain advantages of the invention. The parts of the drum brake assembly of FIG. 2 use the same reference characters as that used in FIG. 1 except for the primary and secondary brake shoe assemblies and the brake linings thereon. The primary brake shoe assembly 218 has the primary lining 240 thereon, and the secondary brake shoe assembly 220 has secondary brake lining 244 suitably secured thereto. In this brake assembly the primary brake lining 240 subtends through a lining arc length of 70° and is symmetrically positioned relative to the horizontal center line 48 of the brake shoe assembly so that the lining arc length on either side of that center line is the same. In a similar fashion, the secondary lining 244 subtends through a lining arc length of 90° and is also symmetrically positioned about the center line 48. The shoe linings 240 and 244 of the brake shoe assembly 210 of FIG. 2 are preferably of the same width as linings 40 and 44 of the brake assembly 10 of FIG. 1. The lining material merely extends through a shorter arc length for the purposes and reasons discussed above and below to obtain the unexpected results neither found nor taught in the prior art. It is to be understood that while the brake linings 240 and 244 as well as the linings of FIGS. 3 and 4, are each considered to be a single continuous brake lining, this does not preclude minor gaps or spacings if the linings are provided in lining segments so long as there is no substantial change in the effective arc lining lengths provided and the lining locations. Similarly, if it becomes desirable to provide a groove in the friction braking surface, either lengthwise or transversely of the brake lining, the linings may still be considered to be a single lining extending continuously through the illustrated arc length.

It can be seen that by shortening the arc lining lengths, the materials that constituted the heels and toes of the linings 40 and 44 have effectively been eliminated so that the effective heel and toe of the friction braking surface of each of the linings 240 and 244 are now positioned much more closely to the center line 48 than heretofore. Furthermore, the ends of each of the linings 240 and 244 are evenly and symmetrically spaced from the center line 248.

The shorter lining arc lengths of FIG. 2 having been tried, it became apparent that some important advantages were obtained, and this then led to the development of shorter arc length linings which were found to be extremely advantageous when each of the linings occupy approximately 50 percent of the lining arc lengths of the prior art linings illustrated in FIG. 1. Therefore, the drum brake assembly of FIG. 3 has such shorter arc length linings which are still symmetrically positioned about the horizontal brake assembly center line 48. In the drum brake assembly 310 of FIG. 3 the primary lining 340 subtends through a lining ar length of about 49° and is positioned symmetrically about the horizontal center line 48. The secondary lining 344 subtends through an arc lining length of about 57° and is also symmetrically positioned about the brake assembly horizontal center line 48. Another modification on which some graphic data is plotted but not otherwise illustrated had the primary and secondary brake lining arc lengths to be about 58° in each instance. Otherwise, the drum brake assembly is the same as that of FIG. 3, and the same hydraulic system (not fully shown) is used.

The drum brake assembly 410 of FIG. 4 is quite similar to the drum brake assembly 310 of FIG. 3. The effective arc length of the primary lining 440 subtends through a lining arc length of about 49° and is positioned symmetrically about the horizontal center line 48. In this instance the effective lining arc length is generated by modifying the primary brake shoe assembly 18 of FIG. 1. This modification is accomplished by removing a substantial portion of the brake lining 40, leaving only a sufficient portion 441 as illustrated in FIG. 4 at one end and a similar sufficient portion 443 at the other end to accommodate suitable fastening means holding the lining to the brake shoe rim. In instances where the prior art lining is cemented to the shoe rim, the entire lining in the areas 441 and 443 may be removed as desired. The removal is so accomplished that the effective lining arc length 440 subtends through the desired lining arc length of approximately one half of the arc length of the prior art lining 40.

The secondary lining 444 shown in FIG. 4 has an effective lining arc length of about 57°, as does the secondary lining 344 in FIG. 3. This lining rs also illustrated as having been modified from the prior art brake shoe assembly 20, including the removal of some lining material from either end of the shoe 44, as shown at 445 and 447 in FIG. 4. As is the case with the primary shoe assembly 418, the shoe assembly 420 has its effective lining arc length subtending through the same arc as that of the secondary shoe illustrated in FIG. 3, and also being positioned symmetrically about the brake assembly horizontal center line 48. The shoes may have the lining ends beveled, with the friction surfaces extending through the requisite arc lengths when new as the linings wear through the beveled area. The effective arc lengths may be increased slightly but remain within the concepts of the invention.

It is to be understood that the minor modifications discussed above with regard to lining segments 440 and 444 are also applicable to the other short arc length lining segments embodying the invention as, for example, lining segments 240 and 244 of FIG. 2 and the lining arc lengths 340 and 344 of FIG. 3.

Figure 5:
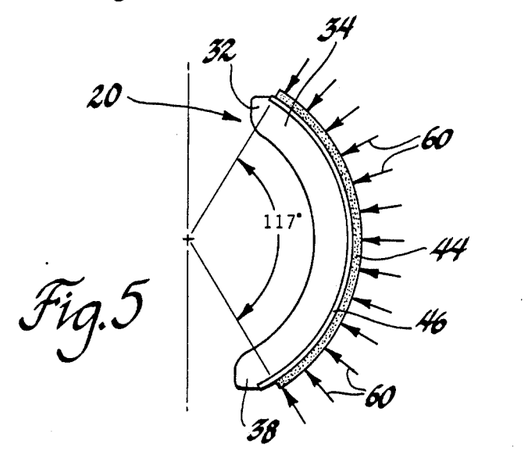
FIG. 5 is a schematic illustration of a typical prior art brake shoe and lining and illustrates the assumed uniform pressure distribution throughout the entire arc length of the lining in earlier common use by brake designers when designing typical prior art drum brakes. This also assumes that the entire arc length of the lining is in contact with the brake drum.

FIG. 5 illustrates the typical brake designer's assumption over the years of a uniform pressure distribution across the entire surface and arc length of the brake lining, with the lining always considered to be in full contact with the brake drum when the brake is actuated.

Figure 6:
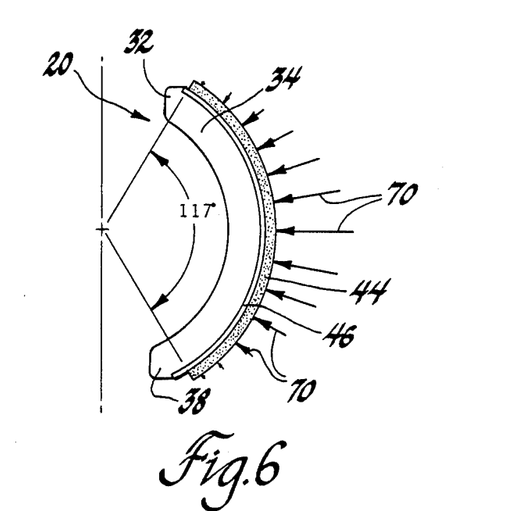
FIG. 6 is similar to FIG. 5 and illustrates the assumed sinusoidal pressure distribution in more recent common use by brake designers when designing typical prior art drum brakes.
Figure 7:
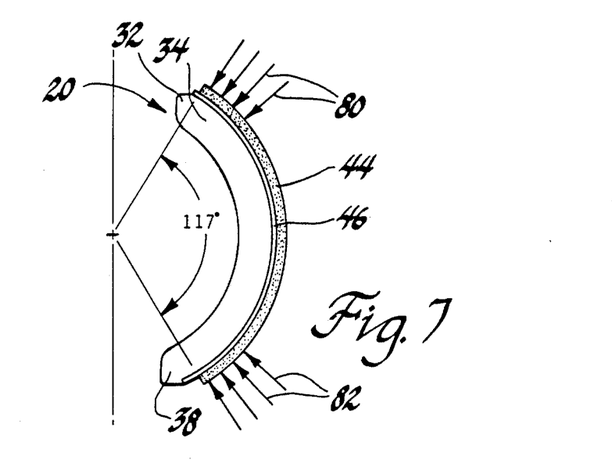
FIG. 7 is similar to FIGS. 5 and 6 but illustrates the potential "worst case" pressure distribution on a prior art duo-servo secondary brake shoe lining as it is in engagement with the brake drum.
Figure 8:
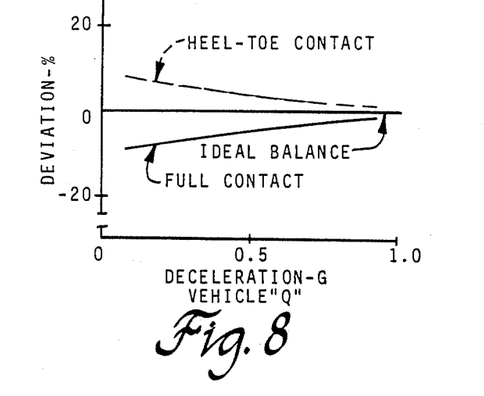
FIG. 8 is a plot of data on a duo-servo drum brake assembly using the shoe and lining assembly of FIG. 1, plotting the deviation from the ideal brake balance in a vehicle having front disc brakes and rear duo-servo drum brakes. The vehicle was a 1986 model year vehicle "Q". One curve of the graph is plotted with full area contact of the brake shoe linings with the brake drum and the other curve of the graph is plotted using the same brake assembly but permitting only heel-toe contact.
Figure 9:
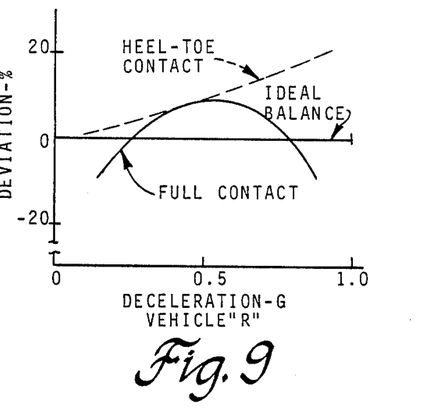
FIG. 9 is similar to FIG. 8 and is a plot of similar data run on a 1980 production vehicle identified as vehicle "R".
Figure 10:
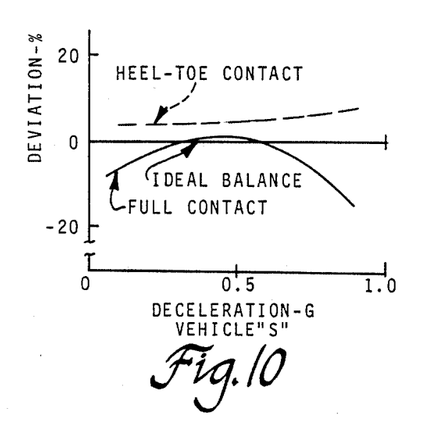
FIG. 10 is similar to FIGS. 8 and 9 with the data plotted from tests on a 1979 vehicle "S" using the production rear duo-servo drum brakes of that vehicle, which are similar to the drum brake assembly of FIG. 1.
Figure 11:
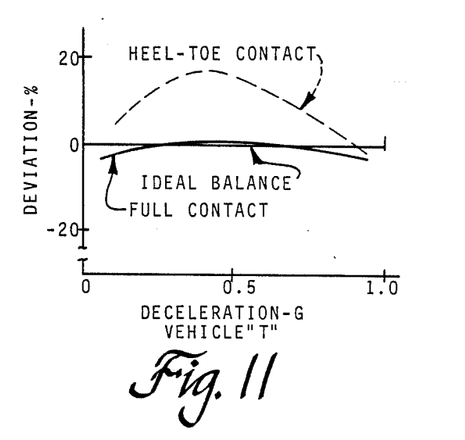
FIG. 11 is a graph similar to FIGS. 8, 9 and 10, plotting data from tests run on a 1981 production vehicle "T" using the production rear duo-servo drum brakes of that vehicle, which are similar to those illustrated in FIG. 1.
Figure 12:
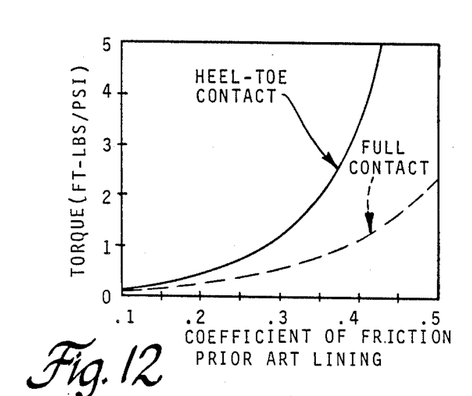
FIG. 12 is a graph illustrating the output sensitivity of a production prior art type duo-servo drum brake like that of FIG. 1, showing one curve plotted from data with brake linings in full contact with the friction surface of the drum and another curve plotting data with brake linings having only heel and toe contact with the brake drum as defined herein. The data plotted is coefficient of friction against specific torque.
Figure 13:
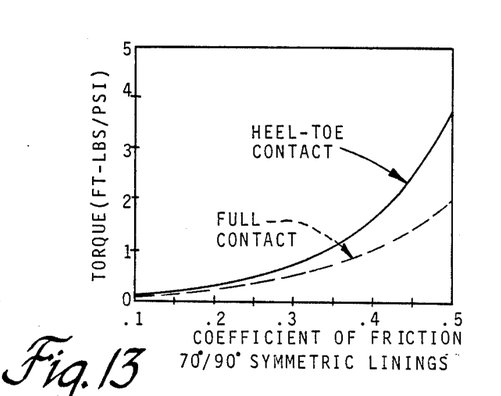
FIG. 13 is similar to FIG. 12 and plots similar data using a duo-servo drum brake like that of FIG. 2 above.
Figures 14, 15, 16, 17:
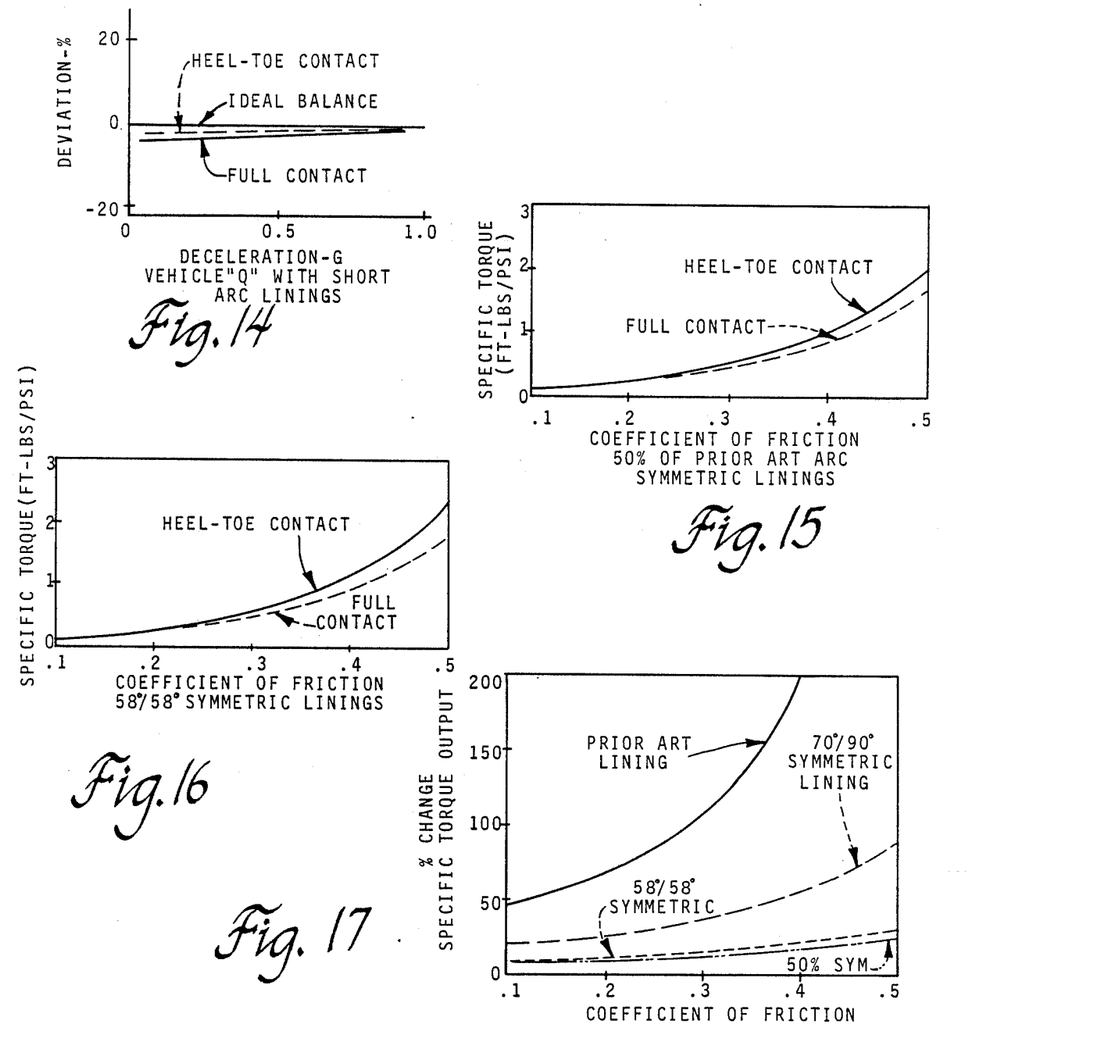
FIG. 14 is a graph similar to FIG. 8 and plotting data with brakes on the same 1986 production vehicle "Q" but with the lining arc lengths being those illustrated in FIG. 3.
FIG. 15 is a graph similar to FIGS. 12 and 13 but plotting data using 50 percent of the typical current production prior art lining arc lengths of the type illustrated in FIG. 3 above.
FIG. 16 is similar to FIG. 15 and is a plot of data using 58° lining arc lengths on the primary shoe and the secondary shoe arranged in a similar manner to the shoes and linings of FIG. 3 above, the shoe lining arc lengths being symmetric about the horizontal center line of the brake shoe assembly.
FIG. 17 is a plot of data using the same vehicle brakes as that used for the data obtained to plot FIG. 12 above, plotting the percent change in specific torque output with changes in the coefficient of friction. One curve relates to that particular test brake lining arrangement. Another curve is a plot of data using the 70°/90° symmetrically arranged lining arc lengths illustrated in FIG. 2 above. A third curve is a plot of data using a primary shoe and a secondary shoe each having a 58° arc lining length which is symmetric about the horizontal center line of the brake shoe assembly. A fourth curve is a plot of data using the 50 percent of prior art and typical production lining arc length brake linings of the type illustrated in FIG. 3 above.
Figure 18:
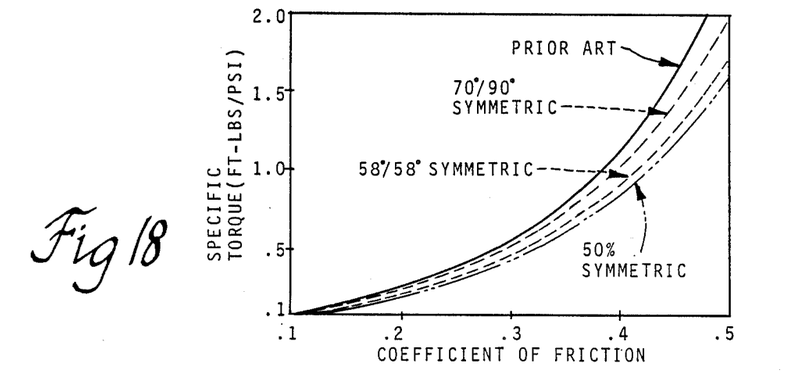
FIG. 18 is a plot of specific torque output of a duo-servo drum brake assembly using the same various arc length configurations used for obtaining the data for the curves of FIG. 17.

FIG. 6 is similar to FIG. 5, but illustrates the later assumption of brake designers that the pressure distribution across the entire brake lining is sinusoidal, being less at the heel and toe and at a maximum at the center of the brake shoe. These discussions are particularly related to the secondary brake shoe of a duo-servo drum brake assembly, and the brake shoe illustrated in each of FIGS. 5, 6 and 7 is the secondary brake shoe 20 of FIG. 1 with the 117° arc length lining 44 installed thereon. Thus the arrows 60 of FIG. 5 illustrate the assumed uniform pressure distribution acting along the entire arc length and surface of lining 44. Similarly, the arrows 70 of FIG. 6 indicate the pressure distribution along the entire arc length of lining 44 assuming the sinusoidal pressure distribution concept.

Recent analytical and vehicle studies, including the test results supporting the actual "worst case" pressure distribution pattern illustrated in FIG. 7, support the present contention that the drum brake output variations are largest when the contact pressure distributions are concentrated at the largest deviations from the horizontal center line 48 of the drum brake assembly. Having made such analyses, studies and tests, tests were performed in which the "worst case" pattern was positively generated. About 80% of the arc length and area of the lining material was removed so that it could not contact the brake drum except for small areas at the heel and toe, substantially in the areas of the pressure distribution arrows 80 and 82 of FIG. 7. Typically, each such area covered to about 10% of the area of the 117° arc length lining. As shown in later graphs when discussing heel-toe contact, such a shoe arrangement produces an output variation of brake effectiveness of approximately twice the nominal drum brake output.

Instrumented torque wheel tests were conducted on a vehicle using a semi-metallic friction lining material in duo-servo drum brakes mounted on the rear axle of the test vehicle. The vehicle was first tested with full lining arc lengths of the type illustrated in FIG. 1. A nominal rear brake specific torque of 0.5 ft-lb/psi was determined to exist after burnishing the rear brakes. The rear lining was then modified to permit lining contact with the brake drum at only about one inch, measured arcuately, at each of the heel and toe of both the primary and secondary linings. This essentially provided brake lining material only in the areas of pressure distribution arrows 80 and 82 of FIG. 7 by removing the lining material between the two adjacent ones of arrows 80 and 82. These linings were reburnished and the rear brake specific torque was again determined with instrumented torque wheels on the vehicle. The rear brake specific torque was found to be approximately 1.0 ft-lb/psi. The same test was repeated with the same vehicle equipped with rear linings having arc length limited to about 60° on each of the primary and secondary brake shoes, with the linings being positioned symmetrically about the horizontal center line of the drum brake assembly. These tests resulted in the finding that the nominal rear brake specific torque was then about 0.35 ft-lb/psi. These linings were then modified to provide only heel-toe contact in a similar manner to that described above, and the rear brake specific torque was found to be 0.38 ft-lb/psi. These test findings were confirmed by analytical results generated using a current state-of-the-art duo-servo drum brake mathematical model having modeling capability to treat non-uniform pressure distributions along the friction interface. Analyses of both duo-servo and leading-trailing brake arrangements show a similar tendency for the specific torque to be influenced by the contact interface pressure distribution. The contact pressure distribution focused at the ends of the full arc length leading-trailing brake indicated an increase in drum brake specific torque of about the same magnitude as that found in the equivalent duo-servo drum brake assemblies.

Because of their generally higher friction coefficients, successful use of non-asbestos friction materials in drum brake applications is particularly dependent upon the recognition of the teaching of this invention wherein the brake specific torque can be controlled so that it remains about the same under various pressure distributions along the friction interface between the lining and the brake drum. This is accomplished by control and positioning of the lining arc length, and particularly the short lining arc lengths disclosed and claimed herein. Without such control and positioning, the tests have clearly shown that drum brake specific torques can be expected to vary beyond acceptable limits. With such control and positioning, the variation of specific torque, or brake effectiveness factor, has been reduced by a factor of about four over the useful life of the lining independently of the friction braking material of which the brake lining is made.

The establishment of particular lining arc lengths in accordance with the above is in part a trade-off between the wear rate of the drum brake lining and the decrease in variability of brake output From the variability point of view, the shorter the lining arc lengths, while locating them symmetrically on the horizontal axis of the drum brake assembly, the less variation of brake specific torque can be expected to occur as the result of changes in the normal friction interface pressure distribution that occurs as the brake lining wears, as well as changes in coefficient of friction due to the use of different lining material compositions. However, the shorter the lining arc lengths, the shorter the lining life and the sooner the linings must be replaced. It has been found that a desirable compromise to obtain the overall best results is to have the arc lining lengths be about one half of the prior art and recent production arc lining lengths exemplified by FIG. 1 of the drawings, such shorter lining arc lengths and lining positioning being illustrated in FIGS. 3 and 4 of the drawings. Slightly shorter arc lining lengths, such as those in FIG. 2, yielded somewhat better results than prior art linings. Once the teaching of the invention herein disclosed and claimed is fully understood, however, it is preferable that the arc lining lengths be in the general area of those shown in FIG. 3. It is within the purview of the invention that the arc lining lengths of the primary and secondary shoe linings may be slightly different as illustrated in FIG. 3, or may be the same as discussed above when arc lining lengths of 58° or 60° were used for test purposes in some instances.

When modifying existing brake assemblies, it may be more economical at times to modify an already completed brake shoe assembly having the brake linings extending through an arc length of about 97° for the primary brake shoe or 117° for the secondary brake shoe without removing the linings themselves. Such a modification is illustrated in FIG. 4. It may be done by a suitable operation such as grinding to remove brake lining portions on either end of the brake lining as shown at 441, 443, 445 and 447 in FIG. 4, reducing the brake lining thickness at those portions so that those portions no longer effectively have friction braking surfaces. Of course, appropriate safety precautions should be practiced during the grinding operation and disposal of the removed materials. For example, Occupational Safety and Health Administration requirements regarding exposure to asbestos should be met when removing asbestos-containing material. Such a removal operation would then leave a brake lining with a friction braking surface having an effective lining arc length in accordance with the invention disclosed and claimed, even though portions of the brake lining extend for a greater arc length. The friction braking surface remains symmetrical about the horizontal center line of the brake assembly, which may also be identified as a center line located at the mid point between the brake shoe ends. This may be particularly desirable when the linings are riveted to the shoe. The lining material could be removed at the lining ends to a depth flush with the rivet ends, for example. In other instances, the original brake lining may be completely removed and replaced by a shorter arc length brake lining in accordance with the invention and illustrated in FIG. 3. Of course, when manufacturing a new drum brake assembly, it would be the normal practice to initially provide the shorter arc length brake lining. However, in some instances it may still be desired to provide a full arc length brake lining with the end portions decreased in thickness as above described. Such modifications are clearly within the teachings and practice of the invention as herein disclosed and claimed.

Once the significance of the background on which the invention was developed has been recognized, it becomes clear that the search by brake designers for many years to maintain more constant drum brake effectiveness throughout the useful life of the brake linings is much better accomplished by use of the invention than by use of the prior art production brake lining such as that shown in FIG. 1. The prior art teachings did not recognize the real causes of their various problems, and therefore they followed different design directions resulting in solutions which did not solve the real problems. It is also an important result of the invention that different brake lining compositions having quite different friction braking characteristics, including different coefficients of friction, may be used without untoward changes in the brake output effectiveness (referred to above as the brake specific torque). In some instances, while retaining the overall brake system design, minor changes may be appropriate, including substitution of a different wheel cylinder size within the same wheel cylinder family, by way of example. Linings containing no asbestos may therefore be substituted in used vehicles originally having asbestos-containing linings. Where only a short time before this invention, the brake industry was indicating that it would be some years before asbestos lining materials could be eliminated, for example, this invention makes it possible to use brake lining materials containing no asbestos without substantial modification of the brake effectiveness in new vehicles using the same current production brake arrangements as well as in older vehicles as the brake linings on the drum brakes of those vehicles are replaced. In some instances, modification of the parking brake actuating mechanism may be required if the brake lining compliance requires such modification. At times the shoe web and rim may have to be strengthened.

This unexpected result is extremely important in meeting the needs as set forth by the U.S. Government and governments of some other countries to eliminate asbestos in brake lining materials as soon as possible. It has the particularly excellent advantage that the brake systems themselves do not require overall modification or redesign. For example, wheel cylinder sizes may not need to be changed, anchor pins need not be redesigned or relocated, master cylinder capacities need not be changed, booster outputs need not be changed, service brake pedal ratios need not be changed, etc. Furthermore, the use of the short arc length brake linings in existing vehicles or new vehicles will not affect the modulation of anti-lock brake control systems on such vehicles because it does not change the hydraulic capacities thereof. The use of the short arc linings proposed as the best compromise will obtain the needed benefits and result in the drum brake linings wearing through their useful life at about the same time and mileage as the front disc brake linings wear, and so require replacement at the same time.

The embodiments of the invention in which an exclusive property or privilege is claimed are defined as follows:

1. For use in a drum brake, a brake shoe assembly comprising a shoe and a friction brake lining secured to said shoe, said brake shoe having a heel end and a toe ends the improvement comprising:

said lining having a friction surface adapted to engage a brake drum for braking action which subtends over a total arc between said shoe heel and toe ends of not more than 60° and is arcuately spaced from said shoe heel and toe ends, said lining being secured to said shoe so that the transverse midpoint of said friction surface is located at the transverse midpoint of said shoe between said shoe heel and toe ends and therefore on the horizontal center line of the drum brake when said brake shoe assembly is installed in and becomes a part of the drum brake;

said brake shoe assembly having a brake effectiveness factor which varies over a range of about one-fourth the range of variation of the brake effectiveness factor of a similar brake shoe assembly whose shoe lining of any one shoe thereof extends through a total arc about 97° to 117° over the useful life of said lining independently of the friction braking material of which said brake lining is made.

2. A drum brake assembly comprising a drum to be braked, a pair of brake shoe assemblies movable to engage said drum in braking relation, and means selectively acting on said brake shoe assemblies to move same to engage said drum, said brake shoe assemblies each having a pair of ends with one end of one brake shoe assembly being adjacent one end of the other brake shoe assembly with said means operatively engaging said adjacent one ends, each of said brake shoe assemblies including friction braking lining mounted thereon for frictionally engaging said drum in braking relation, said friction braking lining having a friction braking surface extending in an arc substantially symmetrical centered on the horizontal center line of said drum brake assembly, said arc being no more than 60°.

3. For use in a drum brake having a brake drum to be braked by friction surface engagement of friction material provided as a part of a brake shoe assembly, said brake shoe assembly comprising:

a brake shoe, friction brake lining secured to said shoe and having a friction braking surface in position to be moved into and out of engagement with the brake drum, said brake shoe having a heel end and a toe end with said friction brake lining being secured to said shoe so that the transverse midpoint of said lining friction braking surface is located on the horizontal center line of the drum brake when assembled therein;

said lining friction braking surface subtending over a total lining arc length of not more than 60°;

said brake shoe assembly having substantially the same brake effectiveness factor variation over the useful life of said lining independently of the friction braking material of which said friction brake lining is made.

4. A modification to a drum brake assembly on existing vehicles in which the drum brake assembly to be modified includes a wheel cylinder and a first brake shoe and a second brake shoe positioned to have adjacent shoe ends operatively engaged by the wheel cylinder so as to be acted thereon when the wheel cylinder is pressure actuated, said first brake shoe having a brake lining secured thereto provided with a friction braking surface which extends throug.h a predetermined arc length, and said second brake shoe having a brake lining secured thereto provided with a friction braking surface which extends through an arc length having a range of about 110° to 120° and being typically an arc length of about 117°, said modification comprising:

changing at least the brake linings of the first and second brake shoes so that the friction braking surface of the brake lining of the first brake shoe and the friction braking surface of the brake lining of the second brake shoe each extends through an arc length no greater than about 50% of the original second brake shoe lining friction braking surface arc length of about 117° and the friction braking surface of each brake lining is so positioned in the drum brake assembly as to be arcuately symmetrical about the horizontal center line of the drum brake assembly.

5. The modified drum brake assembly of claim 4 in which said first brake shoe brake lining friction braking surface before said modification extends through an arc length within a range of about 90° to 100° and being typically about 97°, and after said modification extends through an arc length of about 50% of the original first brake shoe lining friction braking surface arc length of about 97°, and said second brake shoe brake lining friction braking surface after said modification extends through an arc length of about 50% of the original second brake shoe lini.ng friction braking surface arc length of about 117°.

6. The modified drum brake assembly of claim 5 in which the variations in brake effectiveness of the original brake lining friction braking surfaces are reduced by a factor of about four after said modifications.

7. The modified drum brake assembly of claim 5 4 in which said drum brake assembly is a duo-servo drum brake assembly and said first brake shoe is the primary brake shoe and said second brake shoe is the secondary brake shoe thereof and the other adjacent shoe ends opposite the wheel cylinder are connected through a brake adjuster for mechanical servo action.

8. The modified drum brake assembly of claim 7 in which said drum brake assembly brake linings before modification are made of a brake lining composition containing asbestos as a component thereof, and after said modification said brake linings are made of a brake lining composition excluding asbestos, the variation in brake effectiveness with use of said brake linings after said modification being reduced by a factor of about four over the useful brake life of said brake linings, as compared to the variation in brake effectiveness of the pre-modified brake linings over their useful life.

9. A drum brake shoe assembly having a shoe and a brake lining on said shoe, said brake lining normally having its friction surface extending through a lining arc length of about 97° when adapted for use as a primary brake shoe and about 117° when adapted for use as a secondary brake shoe, said brake lining having enough of its friction surface removed so that the lining friction surface arc length is reduced to about 50% of its normal arc length by removing portions of lining material from the heel and toe ends thereof, said lining friction surface arc length then being symmetrical about the shoe assembly installed horizontal center line.

10. The drum brake shoe assembly of claim 9, said friction surface removed portions being removed by substitution of a shorter arc length brake lining for the normal arc length brake lining.

11. The drum brake shoe assembly of claim 9, said friction surface removed portions being removed by decreasing the thickness of the brake lining throughout said portions removed, but leaving thin sections of brake lining throughout said portions which have no normally usable friction braking surfaces.

12. The method of decreasing the variation in brake effectiveness of a drum brake assembly by a factor of about four in a drum brake assembly of the type normally having a first brake shoe and first lining segment thereon with a friction surface extending through an effective friction braking surface arc length of about 97° and a second brake shoe and second lining segment thereon with a friction surface extending through an effective friction braking surface arc length of about 117°, said method comprising the step of reducing the effective friction braking surface arc length of each of said brake shoe friction surfaces to about 40% to 50% of the normal second brake shoe friction surface effective arc length.

13. The method of claim 12 comprising the additional step of positioning each of the so reduced arc length effective friction braking surfaces symmetrically about the horizontal center line of the drum brake assembly.

14. The method of claim 13 wherein the normal effective friction braking surface of each brake shoe is reduced to no more than 60° effective friction braking surface arc length.

15. The method of claim 13 wherein the normal friction braking surfaces of said first and second brake shoes are respectively reduced to effective friction braking surface arc lengths of about 49° and 57°.

16. The method of claim 13 wherein the step of reducing the effective friction braking surface arc length is accomplished by employing new lining segments for the brake shoes having the aforesaid reduced friction braking surface arc lengths in place of the aforesaid normal lining segments.

17. The method of claim 13 wherein the step of reducing the effective friction braking surface arc length is accomplished by removing heel and toe end portions of the lining segments of the normal brake shoes until the reduced effective friction braking surface arc lengths are obtained.

* * * * *